United States Patent [19]

Marshall

[11] 3,829,753

[45] Aug. 13, 1974

[54] DUAL BATTERY CHARGER FOR VEHICLES

[75] Inventor: John J. Marshall, Grand Rapids, Mich.

[73] Assignee: Aichele Associates, Inc., Fort Wayne, Ind.

[22] Filed: Oct. 17, 1973

[21] Appl. No.: 407,237

[52] U.S. Cl............................ 320/6, 320/15, 320/25
[51] Int. Cl............................................... H02j 7/00
[58] Field of Search............ 320/2, 6, 7, 25, 26, 61, 320/15, 16

[56] References Cited
UNITED STATES PATENTS

| | | | |
|---|---|---|---|
| 3,457,491 | 7/1969 | Black et al......................... | 320/61 X |
| 3,654,538 | 4/1972 | Gardberg............................... | 320/7 |

Primary Examiner—J. D. Miller
Assistant Examiner—Robert J. Hickey
Attorney, Agent, or Firm—Hobbs & Green

[57] ABSTRACT

A dual battery charger system for vehicles, such as a system for charging an automobile main battery and an auxiliary battery for a camper, a mobile home, a motor home or boat, in which the system has an ignition coil and a unit having a lead connected to the main battery, a lead connected to the auxiliary battery, a switch interconnecting the leads, and a relay coil for closing the switch. The system is energized by a signal from the ignition coil of the automobile, and includes a subcircuit which protects the system in the event of a short or misconnection. The system can use a weak sensing signal to control the relay and will respond instantaneously to any condition which would be a drain from the main battery to the auxiliary battery.

2 Claims, 2 Drawing Figures

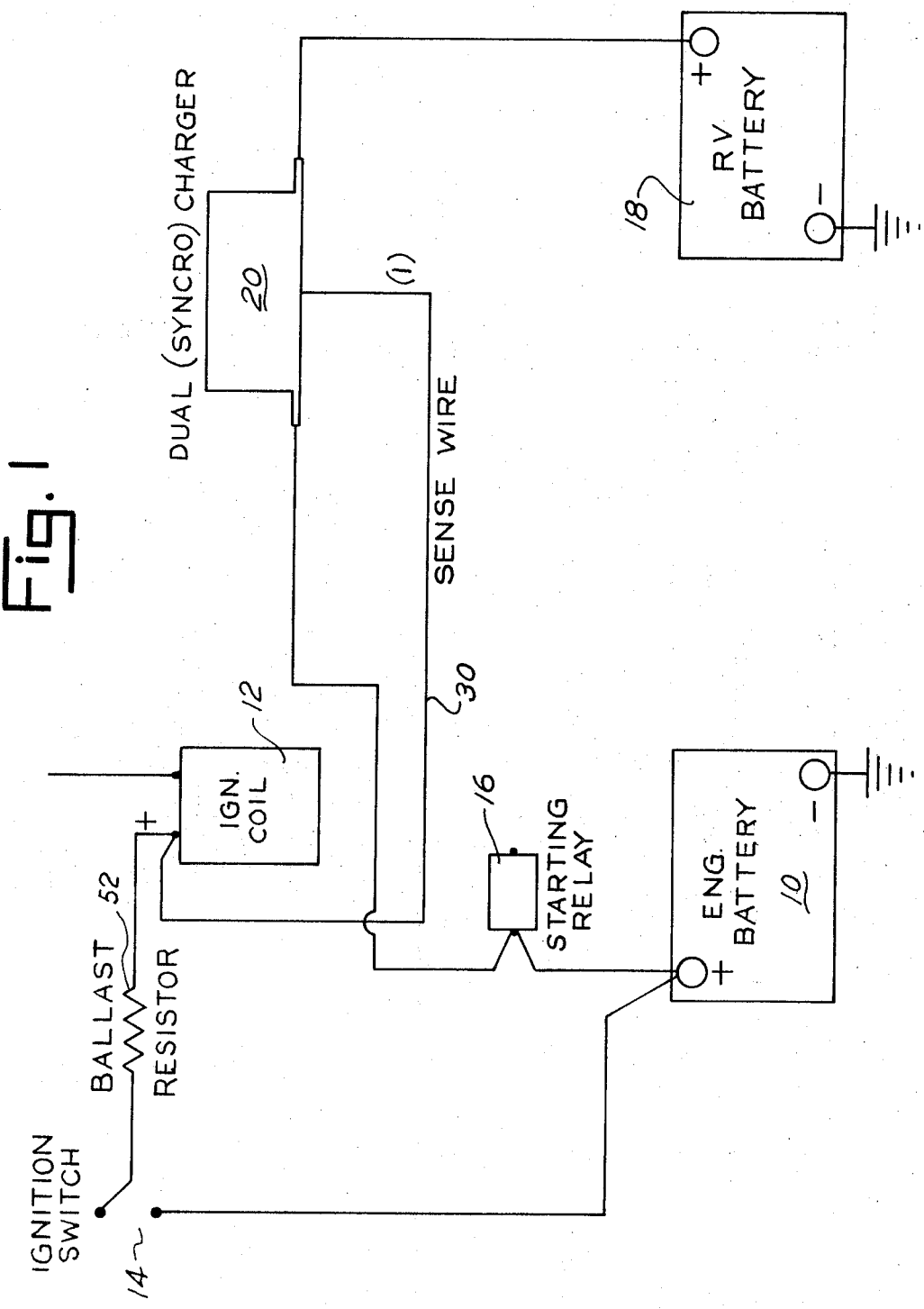

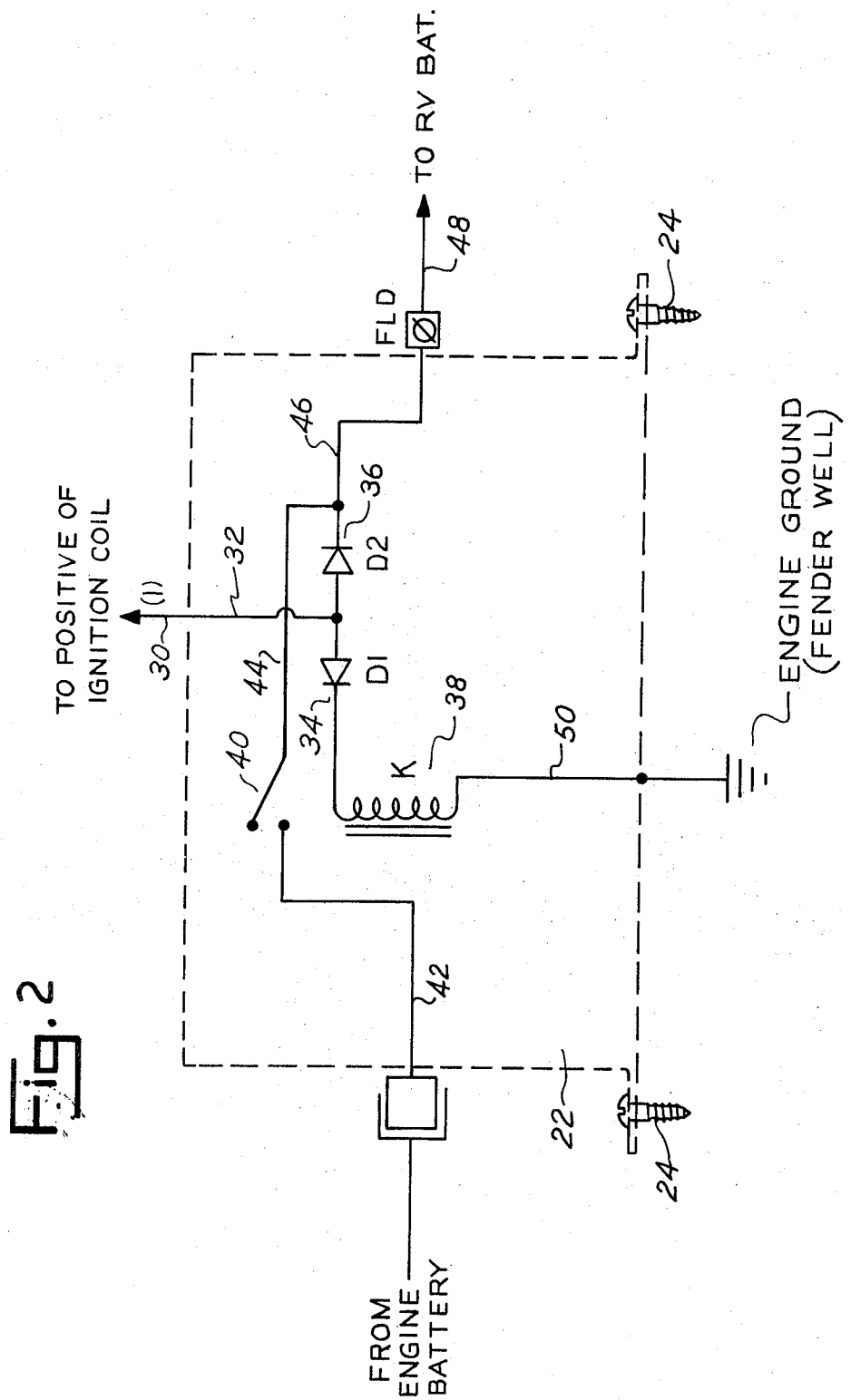

DUAL BATTERY CHARGER FOR VEHICLES

Recreational vehicles such as campers, mobile homes, motor homes and boats often have a 12 volt electrical system and a battery for supplying the needed current when the vehicles are parked or the boat is not operating. The batteries in the recreational vehicles are recharged from the electrical system of the automobile or truck used in towing the trailer, and motor homes and boats use auxiliary batteries while the engine is not operating and simultaneously charge both batteries when the engine is operating. In order to prevent a drain on the main battery when the engine in the towing vehicle, motor home or boat is not operating, an interrupting component is included in the system which prevents the current from flowing from the main current of the engine while the engine is not running. Prior interrupting components have been slow to respond to the current drain and have been unreliable and difficult to install and maintain in effective operating condition. Further, the strictly electromechanical units require a connection to the ignition switch which is difficult, espcially on late model cars with switch on the steering posts. Also, a wire must be run through the firewall. There are diode units on the market. These are costly and require cutting into the alternator circuits, which is very confusing on most cars. Both schemes above also require a circuit breaker to protect their units in event shorts or reverse battery occurs. One of the primary objects of the present invention, therefore, is to provide a dual battery charging system which automatically charges the auxiliary battery when the motor is operating, and automatically disconnects the auxiliary system from the main system when the engine stops, thus preserving the battery in the main system for starting, and avoiding the possibility of permitting the operation of the auxiliary system from running down the main battery.

Another principal object of the present invention is to provide an efficient and reliable solid state electronic and electromechanical circuit for a dual battery charger which involves only three simple easy to make connections during the installation without cutting any wires or making any difficult ignition switch connection and which is designed primarily for light duty recreational vehicles.

Still another object of the invention is to provide a dual battery charging system having an interrupter component responsive to a small current indicating engine operation, to prevent discharging of the main battery through the auxiliary battery when the engine is not operating, which senses the condition under which the drain occurs and instantaneously interrupts the flow of current to the auxiliary battery.

A further object is to provide a dual battery charger system of the aforementioned type which is simple in construction and reliable in operation, and which is economical to install, service and operate.

Additional objects and advantages of the invention will become apparent from the following description and accompanying drawings, wherein:

FIG. 1 is a schematic diagram of an electrical system of an automobile and battery of a recreational vehicle, showing the present dual battery charger incorporated therein: and FIG. 2 is a schematic diagram of an embodiment of the present dual battery charger.

Referring more specifically to the drawings, and to FIG. 1 in particular, the various parts of the present dual battery charger system have been labeled in order to facilitate a ready understanding of the system in which the present dual charger is incorporated. In the system shown in FIG. 1, numeral 10 indicates the main battery of the automobile, 12 an ignition coil, 14 the ignition switch, 16 the starter relay, and numeral 18 the battery of the recreational vehicle such as a camper, motor home or boat, the foregoing components being considered conventional in the description. The remainder of the system of the recreational vehicle is not shown, since the wiring will be considered standard and may be varied to satisfy requirements.

The present dual battery charger is indicated by numeral 20 and can be located at any convenient place on the automobile, normally being installed on the fender well or frame member, and the case 22 and screws 24 which secure the case to the fender well or frame form a negative ground connection for the electrical circuit. In a boat, a wire is connected from the dual charger case to a negative of the engine battery, one tab terminal being connected to the engine battery and the other tab terminal being connected to the recreational battery. The electrical system of the towing vehicle for a camper, which normally would be an automobile, or the electrical system for a motor home or motor boat, will not be described in detail further herein, since the details thereof are not essential for a full understanding of the present invention.

In the embodiment of the invention illustrated in FIG. 2, the sensing lead 30 is connected to the positive terminal of the engine ignition coil. A small amount of current is picked up by the sensing wire 30 from the positive terminal of the ignition coil 12 and is conducted by lead 32 to the junction between diodes 34 and 36. Current from the ignition coil is conducted through diode 34 and energizing relay 38, closing its switch 40 and thus connecting the engine charging system to the recreational battery through leads 42, 44, 46 and 48. The ground lead for the relay is indicated by numeral 50. The diodes protect relay 38 in the event the recreational battery is connected in reverse or the output to the recreational battery is shorted. Since the diodes only conduct current in one direction, diode 34 blocks the reverse current in the event the battery is connected in reverse, and diode 36 will not conduct if all of the connections are proper, but if the output is shorted, diode 36 conducts the short to ground and removes the positive sense voltage transmitted from the ignition coil, thus preventing the voltage from the ignition coil from energizing relay 38, the voltage supplied by the coil being dropped across the auto's ignition ballast resistor 52.

In the operation of the present dual battery charger, when the engine ignition switch 14 has been closed and the engine started, current is supplied to the ignition coil. This activates the dual charger and connects the engine charging system to the recreational battery 18, thus charging the latter battery. When the engine is turned off by opening the ignition switch, the dual charger deactivates and disconnects the recreational vehicle battery from the engine's charging system, thus preventing the engine battery from being drained when a load is placed on the recreational vehicle. The closing of the ignition switch produces a signal which is transmitted from the ignition coil through leads 30 and 32 to the junction between diodes 34 and 36. This current passes through diode 34 and energizes relay 38 which closes switch 40, thus connecting the lead 42 from the engine battery to lead 48 to the recreational vehicle battery, through switch 40 and leads 44 and 46. When the ignition switch is opened and a control signal is no longer produced by the ingition coil and transmitted to the dual charger, relay 38 permits its switch 40 to open, thus interrupting the leads between the engine battery and recreational vehicle battery so that a drain cannot be placed on the engine battery while the ignition switch is off and the engine is not running.

It is seen from the foregoing description with reference to the drawings that the present dual charger control system is relatively simple and contains components which prevent the dual battery charging system from being damaged by a faulty installation or a short in the system, as well as prevent drain on the engine battery when the engine is not operating. In view of the relatively simple circuitry used in the unit 20, it not only provides the advantage of compactness and reliability for a safe and effective operation but can be used effectively and satisfactorily on a variety of different type and sizes of recreational vehicles.

While only one embodiment of the present dual battery charger has been described in detail herein, various changes and modifications may be made without departing from the scope of the invention.

I claim:

1. A dual battery charger for vehicle electrical systems having a main battery, an auxiliary battery and an ignition coil: comprising a lead for connection to the main battery, a lead for connection to the auxiliary battery, a switch interconnecting said leads, a relay coil for closing said switch, a ground for said relay coil, a lead connected to the relay coil for energizing said coil in response to a signal from the ignition coil, and a diode in said last mentioned lead for passing the signal only in the direction to said relay coil.

2. A dual battery charger for a vehicle as defined in claim 1 in which a ground lead interconnects the lead from said ignition coil to said diode with the lead between said switch and the auxiliary battery, and a diode is included in said lead for rendering said interconnecting lead inoperable in the event the system is shorted or improperly installed.

* * * * *